Patented June 8, 1948

2,442,806

UNITED STATES PATENT OFFICE 2,442,806

MANUFACTURE OF A NEW MALT LIQUOR FROM CEREAL PRODUCTS

Alvin C. Gluek, Minneapolis, Minn.

No Drawing. Application March 25, 1943,
Serial No. 480,510

2 Claims. (Cl. 99—36)

This invention relates to the manufacture or production of a distinctively new malt liquor from cereal products such as grains, rice, corn etc.

It is an object of my invention to provide a very thin malt liquor of relatively high alcoholic content, brewed and fermented wholly from cereal products and having a very pleasing, dry distinctive taste not akin to beer, ale, malt, porter, stout, or other fermented beverages commonly brewed from cereal products.

A further object is the production of a distinctively new malt liquor having a relatively high alcoholic content and an exceedingly low real extract and sedimentation content.

Another object is the provision of such a new malt liquor product having excellent keeping qualities and having an exceedingly low content of reducing sugars and real extract and having a saccharometer indication by Balling test heretofore considered most unusual in the brewing of malted cereal products.

It is another and important object of my invention to provide a comparatively simple, scientifically developed process to utilize to fullest advantage the natural ingredients including all starches, proteins, dextrines, and albumins and to likewise use to fullest advantage the various enzymes including maltase, diastase and the various proteinases for the production of the new malt liquor previously referred to as well as other fermented malt cereal beverages.

More specifically it is an object to provide a highly efficient new process for brewing and producing fermented malted beverages from cereal products wherein the fullest and most scientific use is made of the many enzymes including the carbohydrases, such as maltase, diastase and its two components and the various proteinases available from the malt and other cereal products at the optimum temperatures and time periods throughout the process for producing a thorough and highly efficient fermentation with a very low real extract content and an exceedingly low saccharometer indication by Balling test.

A further and more specific object is the provision of a method of the class described wherein a quantity for containing relatively large quantities of enzymes including maltase, diastase and the various proteinases is withdrawn from the main mash at optimum conditions in the mashing operation, and subsequently used in the kettle operation step, cooling operation step and preferably also in the fermenting operation to make available, utilize, saccharify and ferment all possible sugar-producing substances as well as to coagulate and remove practically all albuminoids, proteinoids, and other substances which would normally increase the real extract content of the finished product.

The most important steps of my novel process are carried out in the mashnig operation, in the kettle operation and cooling operation, although I contribute materially to the production of an excellent product by radical changes I have made over previous methods in the fermenting operation both in the period of fermentation and in the temperatures utilized as well as preferably in the utilization of enzyme rich infusion liquor and addition of yeast after most of the original fermentation has taken place.

In carrying out my improved method it, of course, will be well understood that equivalent starch-containing ingredients, malts and other ingredients may be substituted as well as in many instances changes made in the sequence of some of the steps and maintenance of time periods for certain temperatures and as well as utilization of somewhat different proportions of the ingredients, all within the scope of my invention. Most of such variances are well known to me and have been carried out by me in discovering and perfecting my new process and malt liquor product.

For the production of a new thin, malt liquor product made wholly from cereal products including malt, I have discovered by exhaustive research and considerable actual use that highly successful results may be obtained by carrying out my improved process, as follows:

A suitable cereal mash mixture is prepared containing a cereal such as refined grits or rice and a smaller quantity of malt, preferably brewer's malt, properly ground. The exact proportions of the starch-containing cereals, malt and the water with which the cereal ingredients are mixed is not vital but I find that an excellent cereal mash may be made from 2600 pounds refined grits or an equivalent amount of rice or other cereal product with 1200 pounds of ground malt, this mixture being put into about 35 barrels of water which is preferably previously hardened and acidified to a suitable pH value, say approximately 5.3%.

The cooker operation in my process is not as important in the production of my improved results as the subsequent operations, but I prefer to first heat the watered mash mixture for digestion and to extract the soluble proteins and enzymes particularly the alpha-amylase component of diastase at a temperature around 30° Reaumur for a period of 60 minutes. Thereafter and in approximately 15 minutes the temperature of the mash is raised to about 50° Reaumur to allow the alpha-amylase component to commence its action on the starches of the malt and grits. The heating is continued and in approximately 30 minutes the temperature is raised to some point above 52° and preferably not over 58° R. which is the optimum range of temperature for conversion of starches through action of the starch-liquifying enzymes present, chiefly the alpha-amylase component of diastase. Thereafter, in 20 minutes through more application of heat, the temperature is gradually raised to the boiling point 80° R. and held there for 60 minutes, but at the end of 30 minutes after boiling has been attained, the cereal mash is slowly dropped into the main mash which has been simultaneously prepared and may be utilized at that point to raise the temperature of the main mash as will be later more fully brought out. The cooker operation as carried out in my method will quite thoroughly liquify the starches of the cereal ingredients before they are added to the main mash.

In the main mashing operation of my process a relatively large amount of ground malt is placed in the mash tun and mixed with the proper amount of water. Preferably, but not necessarily, approximately 4000 pounds of distiller's malt and 4100 pounds of brewer's malt finely ground are mixed in the tun with approximately 100 barrels of previously hardened water having a pH value of about 5.3%. It will, of course, be understood that various malts or a sufficient quantity of one type of malt alone may be substituted and that the proportions enumerated may be varied considerably all within the scope of our invention. The mixture is digested to extract the soluble proteins, mainly consisting in coagulable albuminoids which will later form a good break in the kettle operation. Preferably the mash is digested at a temperature of about 30° R. for a time period of about 90 minutes. Additional heat is then employed and the temperature of the mixture is gradually raised to 42° R. and held there for approximately 25 minutes to convert the proteins by the appropriate enzymes present, such as proteinase and to partially convert the non-coagulable albuminoids to coagulable state and on the other hand to bring some thereof into solution. Some are made soluble but are not coagulable.

At preferably this temperature of 42° R. and after maintenance of this temperature preferably for several minutes (although it will be understood that the temperature may be varied within a few degrees with the production of fairly satisfactory results), I withdraw a quantity of the thin liquid from the mash preferably an amount constituting from 0.2% to 0.5% of the total barrels brewed which if the proportions previously specified are carried out, would constitute about 20 gallons of the thin infusion liquid. This infusion liquid withdrawn at the optimum range of temperatures from the main mash before the cereal mash is added and after digestion of the ingredients at a lower temperature is exceedingly rich in enzymes, containing a large amount of carbohydrases including maltase and diastase and also a large amount of the proteinases. This withdrawn infusion liquid is preferably kept cool at a sufficiently low temperature to prevent infection thereof by bacteria.

After withdrawal of the infusion liquid the cereal or cooker mash at its boiling temperature is preferably very slowly added to the main mash (usually around 20 minutes being required), and of course raises the temperature of the resultant mash mixture, the addition being preferably controlled to raise the temperature of the resultant mash to about 52° R. This temperature is preferably maintained for an additional 30 minutes for complete liquification of starches and thereafter additional heat is applied to raise the temperature of the mash mixture in a short period of time, for example, about five minutes to a range between 54° R. and 56° R. The temperature is held at that level for a short period, preferably about 30 minutes to obtain a thorough saccharification of the starches, mainly through the beta-amylase component of the diastase. At this point an iodine test should be neutral. Thereafter the temperature is quickly raised (preferably in about 5 minutes) to approximately 58° R. and the mixture maintained at such temperature for 15 minutes and mashed off to convert all remaining starches.

It will be noted that the total time period for my mashing operation is considerably longer than that utilized in the average brewing process and that I utilize preferably five different temperature steps for accomplishing the specific results as enumerated.

In the kettle operation of my improved process the wort is filtered off from the mash tun and run into the kettle in the conventional way and thereupon a quantity of the enzyme-rich infusion liquid (preferably about ¼ of the total withdrawn from the main mash), is added to the first wort, the temperature of the mixture then being within a range between 50° R. and 58° R. This infusion liquid or rather the enzymes contained therein, act upon the non-fermentable and difficultly fermentable sugars and dextrines converting them to a large extent into sugars which are capable of fermentation. Preferably steam is not turned on in the kettle and the kettle is not otherwise heated to high temperatures until after 75% of the first wort has been drawn off from the mash tun into the kettle. The mixture in the kettle is slowly brought to the boiling point 80° R. and boiled along with the remainder of the wort for an adequate period of time, preferably equivalent to four hours at atmospheric pressure. During the boiling, hops are added in the usual manner and brewing sugar (cerelose) or its equivalent may be added directly to the kettle and with the proportions of ingredients previously specified about 1600 pounds of cerelose is suitable.

It will, of course, be understood that instead of adding brewing sugar at this point additional sugar value as desired may be obtained by utilizing more starch cereal products, such as grits, rice and etc. in the cereal mash during the cooking operation.

The wort so prepared is drawn from the kettle and cooled by passing over suitable cooler apparatus and while cooling most of the remainder of the withdrawn enzyme-rich infusion liquid (about ¾ of the total amount withdrawn) from this brew or a previous brew is added to the cooler pan and the wort cooled preferably to a temperature range between 8° and 10° R. The addition of the large proportion of the infusion liquid at this time accomplishes a further breakdown of the various difficultly fermented and otherwise non-fermentable sugars and dextrines thus finely preparing the wort most efficiently for the succeeding fermenting operation.

The wort is taken from the cooler pan and pitched at a temperature between preferably 8° and 10° R. and mixed for fermentation with preferably bottom fermenting yeast (Saccharomyces cerevisiae). Fermentation is carried on at a temperature preferably slightly below 13° throughout from 18 to 20 days. My process during the fermentation operation differs materially from processes now extensively utilized for fermenting many malt cereals both in the time of the fermenting period (the average being from 7 to 14 days), and in the fermenting temperature where the average temperature is considerably lower, between 6° and 8° R. The relatively long fermenting period is an important factor in obtaining my improved results.

I prefer, at the end of the ninth or tenth day of fermentation to add a small amount of the enzyme-rich infusion liquid (for example from 5 to 7½% of the total amount of infusion liquid withdrawn from this brew or a previous brew of like proportion), and I also prefer to add a fourth of the amount of yeast originally used at the same time. The infusion liquid contains a large amount of maltase and consequently a more thorough fermentation and utilization of all sugars and fermentable ingredients is thereby accomplished.

It will, of course, be understood that reasonably successful results can be obtained with the elimination of the infusion liquid and additional yeast in the fermenting operation.

It will further be understood that the proportions, temperatures and precise sequences related are merely exemplary and may vary considerably for producing products within a considerable range of variety, all within the scope of my invention. For the production of the distinctive new malt liquor product made wholly from cereal products best results are obtained when approximately the preceding sequences and steps are carried out within fairly close limits as to times and temperatures to those specified.

Carrying out of my improved method substantially as heretofore set forth results in the production of a very high grade, thin and distinctively new malt liquor having an alcoholic strength of approximately 7% by volume and having a Balling test of approximately 1.0%. For example, in a brew of over 200 barrels recently carried out under my herein recited process, the analysis of the malt liquor was, as follows:

| | |
|---|---|
| Specific gravity—actual weight | 1.00390 |
| Saccharometer indication—Balling test per cent | 1.0 |
| Alcohol by weight do | 5.50 |
| Alcohol by volume do | 7.00 |
| Real extract do | 3.1 |
| Reducing sugars do | 1.0 |
| Iodine reaction—slight trace erythrodextrin | |
| Total acids as lactic acid per cent | 0.13 |
| Protein do | 0.47 |
| pH value do | 4.8 |
| Extract of original wort do | 14.1 |
| Real degree of fermentation do | 78.0 |
| Apparent degree of fermentation do | 92.9 |

An inspection of the above analysis will show an astounding variation from any brewed products known at this time particularly as to the Balling test indication, the alcoholic content, real extract, the reducing sugars and the real and apparent degrees of fermentation.

The foregoing analysis is, of course, only an assembly of a brew having an alcoholic strength of approximately 7% by volume. With my process I have obtained products having Balling tests below 0.4; having protein contents as low as 0.38; and having lowered real extract contents accordingly. I have obtained products having alcoholic strengths ranging from 2.75% to somewhat above 11% by volume.

My new process may be considerably varied with the production of satisfactory results although the sequence of steps, substantial proportions, time periods and temperatures previously recited are preferable to any of the known variations. In my extensive research work I have found a number of variations will produce good results and hereafter recite three of such variations.

1. The 20 gallons of enzyme containing infusion is withdrawn at 30° R. from the mash tun after the malt has been digested for 90 minutes at that temperature for protein and enzyme solution. The remaining mash is carried through the steps: 30° R. to 42° R. in 15 minutes, 42° R. for 25 minutes for protein conversion; 42° R. to 52° R. in 30 minutes by the addition of the cooker mash, 52° R. for 30 minutes for liquification of starches; 52° R. to 54° R.–56° R. in 5 minutes 54° R.–56° R. for 30 minutes for saccharification of the starches; 54° R. to 58° R. in 5 minutes, 58° R. for 15 minutes and mashed off.

Mash liquid is run into kettle, boiled and hopped in the usual manner. 10 gallons of enzyme infusion is added in the cooler pan when the wort from the kettle is being cooled.

5 gallons of enzyme infusion is added to the liquid in the starting tub when the yeast is pitched.

Fermentation is carried out by bottom fermenting yeast at a maximum of 13° R.

On the second day of fermentation 5 gallons of enzyme infusion is added to the fermenting liquid.

Time of fermentation is 18 days.

2. The malt is digested at 30° R. for 90 minutes for the protein and enzyme solution. It is raised to 42° R. in 15 minutes. 20 gallons of liquid which is rich in enzymes is withdrawn from the mash tun when the temperature of 42° R. is reached. This is stored in a cool place. The main mash is maintained at 42° R. for 25 minutes for protein conversion. It is raised from 42° R. to 52° R. in 30 minutes by the addition of the cooker mash; maintained at 52° R. for 30 minutes for liquification of starches. It is raised from 52° R. to 54° R.–56° R. in 5 minutes, maintained at 54° R.–56° R. for 30 minutes for saccharification of the starches. It is raised from 54° R.–56° R. to 58° R. in 5 minutes, maintained at 58° R. for 15 minutes and mashed off. Mash liquid is run into the kettle and immediately 5 gallons of the enzyme solution is added to the kettle. The material is boiled and hopped in the usual manner.

The boiled wort is cooled over a cooler and 15 gallons of the infusion is added in the cooler pan.

The wort is fermented by bottom fermenting yeast at a maximum temperature of 13° R.

After 10 days of fermentation, 2½ gallons of enzyme infusion that has been taken from another brew on that day, is added to the fermenting wort. One quarter of the original quantity of yeast is added also at this time.

Time of fermentation is 18 days.

3. The malt is digested at 30° R. for 90 minutes for the protein and enzyme solution. It is raised to 42° R. in 15 minutes. At some temperature between 30° R. and 42° R. 20 gallons of the liquid is drawn off and stored in a cool place. This liquid is referred to as the enzyme infusion. The mash is maintained at 42° R. for 25 minutes for protein conversion. It is raised from 42° R. to 52° R. in 30 minutes by the addition of the cooker mash; maintained at 52° R. for 30 minutes for liquification of starches. It is raised from 52° R. to 54° R. in 5 minutes, maintained at 54° R.–56° R. for 30 minutes for saccharification of the starches. It is raised from 54° R.–56° R. to 58° R. in 5 minutes, maintained at 58° R. for 15 minutes and mashed off.

Mash liquid is run into kettle, boiled and hopped in the usual manner.

15 gallons of the enzyme infusion is added in the cooler pan when the wort from the kettle is being cooled.

The wort is fermented by bottom fermenting yeast at a maximum temperature of 13° R.

After 2 or 3 days of fermentation, 5 gallons of enzyme infusion, that has been taken from another brew on that day, is added to the fermenting wort.

Time of fermentation is 18 days.

The product obtained through the carrying out of my novel process is apparently a distinctively new malt liquor, having very thin physical characteristics and having a distinctively new dry and pleasing taste. The taste is not similar to the tastes of any of the fermented malt cereal products specified by the Federal Alcohol Administration including the beverages commonly brewed today such as beer, ale, malt, porter or stout. It has a test by Balling far below what has been generally thought possible in a brewed product and its real extract and sedimentation content, it will be noted, are very low, while its alcoholic content is very high.

This new thin malt liquor has excellent keeping qualities, is not filling or bloating when consumed in quantity, and is comparable for use with high content dry wines or beverages made from distilled liquors.

It does not materially lessen the appetite for food when taken in normal quantities before a meal.

While my method as herein set forth is particularly adapted for producing the new distinctive malt liquid product having a comparatively high alcoholic content and surprising low extract content and test by Balling, it is also well suited for making improved beers, ales, stouts, porter and other fermented malt cereal products when lesser amounts of starch-containing cereal products and sugars are utilized. In every case, however, the fermented malted cereal products made within the scope of my improved process have a relatively very low extract content and saccharification indication by Balling test as contrasted with other standard malt cereal beverages and have improved keeping qualities and less calorific value of the extract.

In actual use I have brewed improved beers, ales and other fermented malt cereal products by carrying out the steps of the process disclosed herein, utilizing lesser amounts of cereals and/or sugars but nevertheless obtaining a more complete fermentation of the ingredients used with the substantial reduction of solid ingredients and food ingredients in the final product.

What is claimed is:

1. The method of producing a new malt liquor beverage having an alcoholic content by volume, between 5% and 7.5% and having a saccharometer indication by Balling test between 0.5% and 1.0% which consists in preparing a cooker mash composed of malt, cereal products and water, liquefying the starches of this mash, preparing a main mash containing a large amount of malt and first heating this main mash at a temperature favorable to extraction of soluble proteins and then heating said main mash for a relatively short period of time at a temperature between 42° and 45° R., withdrawing from said main malt mash during the mashing operation and within said temperature range, a quantity (between 1% and 3% of the total volume of the product to be brewed) of the thin infusion liquid present which is rich in maltase, diastase and proteinases, thereafter adding the hot cooker mash to the main mash and raising the tempererature of the main mash to a point not to exceed 60° R. to complete liquefaction of starches and to saccharify and convert most of the starches and dextrins, drawing off the wort liquid from the mash and boiling the mixture for a period of hours and adding hops, then cooling the wort so produced to a temperature approximating 9° R. and during said cooling operation, adding to the wort at least one half of said withdrawn fusion liquid to cause the infusion enzymes to act upon the dextrins, non-fermentable sugars and difficultly fermentable sugars, fermenting the cooled wort for a total fermentation period from 16 to 20 days and adding to the mixture during fermentation, after the 6th day, a small amount of said withdrawn infusion liquid, totaling less than .05% of the total volume in fermentation to materially assist fermentation and break-down of the difficultly fermentable sugars.

2. The method of producing a new malt liquor beverage having an alcoholic content by volume, between 5% and 7.5% and having a saccharometer indication by Balling test between 0.5% and 1.0% which consists in preparing a cooker mash composed of malt, cereal products and water liquefying the starches of this mash, preparing a main mash containing a large amount of malt and first heating this main mash at a temperature favorable to extraction of soluble proteins and then heating said main mash for a relatively short period of time at a temperature between 42° and 45° R., withdrawing from said main malt mash during the mashing operation and within said temperature range, a quantity (between 1% and 3% of the total volume of the product to be brewed), of the thin infusion liquid present which is rich in maltase, diastase and proteinases, thereafter adding the hot cooker mash to the main mash and raising the temperature of the main mash to a point not to exceed 60° R. to complete liquefaction of starches and to saccharify and convert most of the starches and dextrins, drawing off the wort liquid from the mash and adding to this wort prior to use of steam or boiling, from ¼ to ⅓ of the said withdrawn infusion liquid to convert through the enzymes contained, the non-fermentable dextrins and difficultly fermentable sugars, then heating the wort slowly to gradually bring the same to boiling, and boiling the mixture for a period of hours and adding hops, then cooling the wort so produced to a temperature approximating 9° R. and during said cooling operation, adding to the wort at least one half of said withdrawn fusion liquid to cause the infusion enzymes to act upon the dextrins, non-fermentable sugars and difficultly fermentable sugars, fermenting the cooled wort for a total fermentation period from 16 to 20 days and adding to the mixture during fermentation, after the 6th day, a small amount of said withdrawn infusion liquid, totaling less than .05% of the total volume in fermentation to materially assist fermentation and break-down of the difficultly fermentable sugars.

ALVIN C. GLUEK.

REFERENCES CITED

The following references are of record in the file of this patent:

UNITED STATES PATENTS

| Number | Name | Date |
|---|---|---|
| 255,203 | Seitz | Mar. 21, 1882 |
| 466,151 | Billings | Dec. 29, 1891 |
| 925,700 | Henius | June 22, 1909 |
| 1,328,079 | Davis | Jan. 13, 1920 |
| 1,896,658 | Beaublen | Feb. 7, 1933 |
| 2,146,240 | Thomas | Feb. 7, 1939 |
| 2,222,306 | Atwood | Nov. 19, 1940 |
| 2,223,444 | Distler | Dec. 3, 1940 |

FOREIGN PATENTS

| Number | Country | Date |
|---|---|---|
| 2,384 | Great Britain | 1902 |

OTHER REFERENCES

Wahl-Henius American Handy Book of Brewing and Malting, vol. 2, third ed. Wahl-Henius Institute, Chicago.